O. C. ROEDLER.
NUT LOCK.
APPLICATION FILED NOV. 1, 1909.

964,813. Patented July 19, 1910.

attest:
H. G. Fletcher,
N. G. Butler

Inventor:
Oliver C. Roedler.
By Higdon & Longan.
Attys.

UNITED STATES PATENT OFFICE.

OLIVER C. ROEDLER, OF ST. LOUIS, MISSOURI.

NUT-LOCK.

964,813.  Specification of Letters Patent.  Patented July 19, 1910.

Application filed November 1, 1909. Serial No. 525,614.

*To all whom it may concern:*

Be it known that I, OLIVER C. ROEDLER, a citizen of the United States, and resident of St. Louis, Missouri, have invented certain new and useful Improvements in Nut-Locks, of which the following is a specification containing a full, clear, and exact description, reference being had to the accompanying drawings, forming a part hereof.

My invention relates to improvements in nut locks, the object of my invention being to construct a nut having internal screw threads and external screw threads, the threads being oppositely cut, and, to provide therefor an internally threaded nut to engage with the exterior threads of the first mentioned nut, the internal threads of each nut being formed throughout only a part of the length of the nut, there being means for securing the first mentioned nut to the bolt and means for locking the two nuts against movement in one direction relative to each other.

Figure 1:
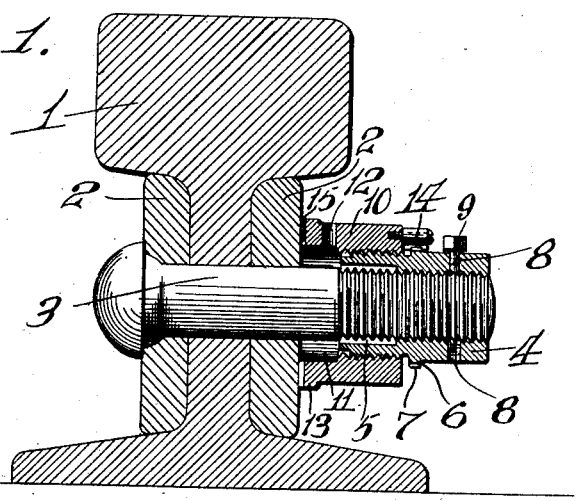
Figure 3:
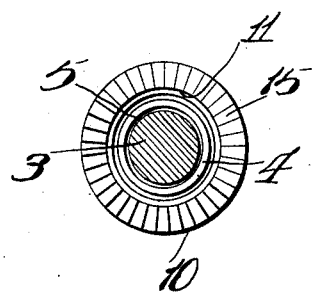
Figure 2:
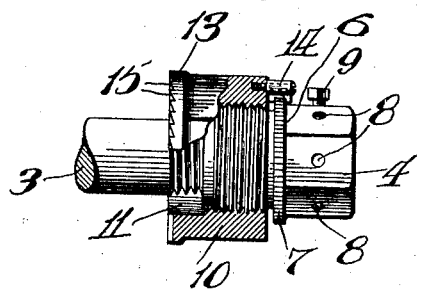
Figure 4:
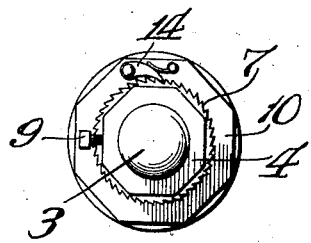

For the above purposes my invention consists in certain novel features of construction and arrangement of parts as will be hereinafter more fully described, pointed out in the claims and illustrated by the accompanying drawing, in which:

Figure 1 is a vertical, sectional elevation through a rail and fish plates and shows a bolt extended therethrough having my improved nuts applied thereto, the nuts being shown in section; Fig. 2 is an elevation of the nuts applied to a bolt, the exterior nut being partly in section; Fig. 3 is an inside face view of the assembled nuts applied to a bolt, the bolt being shown in section; and Fig. 4 is an outside end view of the two nuts applied to a bolt.

Referring by numerals to the accompanying drawing: 1 designates a section of steel rail, 2 the fish plates and 3 a bolt of ordinary construction which is inserted through openings formed in the fish plates and through the opening formed in the web of the rail 1, the rail, the fish plate and bolt being of ordinary construction.

4 designates a nut provided with internal threads arranged to engage with the threads formed on the bolt 3.

5 designates an enlarged portion of the opening through the nut 4 which is not threaded and is of a greater diametrical dimension than the dimension of the threads.

Formed at approximately the longitudinal center of the nut 4 is an annular flange 6 having ratchet teeth 7 on its periphery, the portion of the nut on the right hand side of said flange being angular and preferably octagonal, and, formed through each of the faces of the angular portion is a screw seat 8 and carried by one of said screw seats is a set screw 9.

Arranged to be threaded upon the exterior threads of the nut 4 is a locking nut 10 which is internally screw threaded to engage the threads formed on the exterior of the nut 4, and formed within the nut 10 is an unthreaded portion 11, preferably of a greater diametrical dimension than the threaded portion and formed through the nut 10 is an oil hole 12 connecting with the unthreaded portion 11.

Formed adjacent the left hand end of the nut 10 is an annular flange 13, and the portion of the nut 10, to the right of said flange being angular and preferably octagonal.

Pivotally mounted upon the right hand end of the nut 10 is a spring actuated pawl 14 arranged to engage the ratchet faces 7 of the nut 4 to prevent movement of the two nuts in one direction relative to each other. Formed on the left hand face of the nut 10 is a series of radially arranged teeth 15, arranged in such manner as to prevent a movement of the nut 10 when it engages the fish plate.

In the employment of a nut of my improved construction the nut 10 is threaded to the nut 4, it being understood that the external thread of the nut 4 and the internal thread of the nut 10 are left handed threads, the two nuts are then placed over the bolt and the nut 4 is then turned until the ratchet faces 15 of the nut 10 engage with the fish plates. It is obvious then that the nuts may be tightened against the fish plate by a movement of the nut 10 over the nut 4 until it is firmly seated against the fish plate. The nut 4 is then secured against rotation on the bolt 3 by means of the set screw 9, and the nut 10 is prevented from turning in a loosening direction upon the nut 4 by means of the pawl and ratchet.

It is to be noted that nuts of this construction completely cover the bolt, thus protecting the bolt and the threads of the nuts against the weather. It is to be noted that the nut 4 is internally threaded for only a part of its length, thus the nut may be moved over the bolt beyond the threads thereof to provide for a greater adjustment of nut relative to the bolt.

It is to be noted further that the enlargements 11 and 5 of the nuts provide a cavity in which oil may be introduced for purposes of facilitating the threading of the nuts to the bolt and to each other.

When a nut of this construction is placed in position upon a rail, the shocks incident to passing trains will not loosen the nuts from the bolt by reason of the locking devices such as the set screw 9 and the pawl and ratchet connection between the two nuts.

While I have shown my nut in connection with a rail and fish plates, I do not wish to be understood as limiting myself to this use only, for I believe the nut is equally applicable to all forms of machinery having jarring or tremulous motions, such as harvesters and the like.

While I have shown the nut 10 in a set position having its right hand face placed slightly apart from the flange 6 of the nut 4 and employing the pawl and ratchet to prevent movement of the nuts relative to each other, it is obvious that in some instances the pawl and ratchet devices may be dispensed with and the nut 10 employed as a jam nut with its right hand end impinging the flange carried by the nut 4.

I claim:

1. In combination with a threaded bolt a nut lock, comprising a nut having an internal thread formed throughout a portion only of its length arranged on said bolt, an external flange formed integral with said nut, the outside of the nut to the right of said flange being angular and the portion of the nut on the left hand side of said flange being provided with external threads oppositely formed with relation to the internal threads, a second nut having internal threads throughout a portion only of its length and arranged to be threaded over the first mentioned nut, the unthreaded portion of each nut being capable of extension beyond the inner end of the threads on the bolt.

2. In combination with a bolt having a right hand thread, a nut having internal right hand threads throughout a portion of its length, a flange formed integral with said nut, the portion of the nut to the right of said flange being angular, the portion of the nut to the left hand side of said flange being provided with external left hand threads throughout a portion of its length, a second nut having internal left hand threads arranged to engage the left hand threads of the first mentioned nut, means for securing the first mentioned nut to said bolt and means for preventing the nuts turning relative to each other.

3. The combination with a nut having a flange adjacent its longitudinal center, left hand threads formed on said nut on the left hand side of said flange, the portion of the nut on the right hand side of said flange being angular, internal right hand threads formed on said nut throughout a portion of its length, the remainder of the inside face of the nut being smooth and of a greater diameter than the threaded portion, of a second nut, the exterior of which is angular and provided with internal left hand threads throughout a portion of its length for engagement with the left hand threads of said first mentioned nut, the remaining portion of the inside face of said nut being smooth and of greater diameter than the threaded portion.

4. The combination with a nut having a flange adjacent its longitudinal center, left hand threads formed on said nut on the left hand side of said flange, the portion of the nut on the right hand side of said flange being angular, internal right hand threads formed in said nut throughout a portion of its length, the remainder of the inside face of the nut being smooth and of a greater diameter than the threaded portion, of a second nut, the exterior of which is angular and provided with internal left hand threads throughout a portion of its length for engagement with the left hand threads of said first mentioned nut, the remaining portion of the inside face of said nut being smooth and of a greater diameter than the threaded portion, there being a plurality of screw threaded openings formed in the first mentioned nut, a set screw carried by one of said openings, a ratchet face formed on the flange of the first mentioned nut, and a pawl carried by said second nut for engagement with said ratchet face.

In testimony whereof, I have signed my name to this specification, in presence of two subscribing witnesses.

OLIVER C. ROEDLER.

Witnesses:
E. E. LONGAN,
E. L. WALLACE.